(12) United States Patent
Benning et al.

(10) Patent No.: US 7,406,335 B2
(45) Date of Patent: Jul. 29, 2008

(54) MULTIPLE ANTENNA TRANSMISSIONS WITH DETERMINISTIC PHASE DIFFERENCES

(75) Inventors: Roger David Benning, Long Valley, NJ (US); Achilles George Kogiantis, Madison, NJ (US); Pantelis Monogioudis, Randolph, NJ (US); Aris L. Moustakas, New York, NY (US); Lawrence Howard Ozarow, Morris Township, NJ (US); Steven H. Simon, Hoboken, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 899 days.

(21) Appl. No.: 10/341,515

(22) Filed: Jan. 13, 2003

(65) Prior Publication Data

US 2004/0137948 A1    Jul. 15, 2004

(51) Int. Cl.
*H04M 1/00* (2006.01)
(52) U.S. Cl. .................. 455/562.1; 455/63.1; 455/67.13
(58) Field of Classification Search ............... 455/562.1, 455/63.4, 25, 275, 277.1, 272, 651, 561, 455/63.1, 67.13; 375/299
See application file for complete search history.

(56) References Cited

U.S. PATENT DOCUMENTS

| | | | | |
|---|---|---|---|---|
| 6,778,844 B2 * | 8/2004 | Hood, III | ................. | 455/562.1 |
| 6,804,521 B2 * | 10/2004 | Tong et al. | .................. | 455/450 |
| 6,847,810 B2 * | 1/2005 | Shen et al. | ................ | 455/277.2 |
| 6,862,434 B2 * | 3/2005 | Wallace et al. | .............. | 455/101 |
| 6,892,059 B1 * | 5/2005 | Kim et al. | .................... | 455/272 |
| 6,894,643 B2 * | 5/2005 | Guo et al. | .................... | 342/383 |
| 2002/0009156 A1 * | 1/2002 | Hottinen et al. | .............. | 375/267 |
| 2002/0072393 A1 * | 6/2002 | McGowan et al. | .......... | 455/562 |
| 2004/0204111 A1 * | 10/2004 | Ylitalo | ..................... | 455/562.1 |

OTHER PUBLICATIONS

Article entitled, "Opportunistic Beamforming Using Dumb Antennas," from IEEE Transactions on Information Theory, vol. 48, No. 6, Jun. 2002.

* cited by examiner

*Primary Examiner*—Edward Urban
*Assistant Examiner*—Raymond S. Dean

(57) ABSTRACT

A wireless data communication system simultaneously transmits data signals from more than one antenna with a deterministic, time-dependent phase difference between the signals. In one example, more than one antenna transmits the same data signal with a phase difference between the transmitted signals. In another example multiple users' data signals are simultaneously transmitted using a corresponding plurality of beams that each use at least two transmitting antennas. Transmissions to multiple users on a shared packet data channel can be scheduled at the same time. In one example, the phase difference is periodic and the beams are orthogonal to maximize system throughput even when one or more users is stationary or slowly moving.

23 Claims, 2 Drawing Sheets

MULTIPLE ANTENNA TRANSMISSIONS WITH DETERMINISTIC PHASE DIFFERENCES

BACKGROUND OF THE INVENTION

1. Field of the Invention

This invention generally relates to wireless communication systems and more particularly to wireless systems for transmitting data to mobile receivers.

2. Description of the Related Art

Communication systems such as wireless systems are designed to meet various demands of subscribers. Service providers continuously seek ways to improve the overall performance of the communication system. As wireless communications become more and more popular for subscribers to obtain data (i.e., email or information from the internet), communication systems must be capable of a higher throughput.

Proposed arrangements include scheduling the subscribers or users of the system according to the user's channel conditions. For example, a user is scheduled optimally when the user's channel is at a peak. When there are multiple data users within a cell, the transmission to a particular user may be delayed until the corresponding channel conditions improve. By switching between the various users depending upon their respective channel conditions, it becomes possible to schedule multiple users to receive information at different times. The nature of packet data transmission and reception allows for longer delays between transmissions compared to voice users.

One difficulty is presented when one or more subscribers in an area are stationary or moving relatively slowly. In this case their channel conditions may be adverse for extended periods of time. Even if these users are scheduled for transmission during those times, they will not be receiving data at the optimum rate, thereby diminishing the over-all system throughput.

This invention increases the throughput of a wireless data communication system especially when there are subscribers within an area that are stationary or moving slowly.

SUMMARY OF THE INVENTION

In general terms, this invention is a wireless data communication system that simultaneously transmits at least one data signal from more than one antenna with a deterministic time dependent phase difference between the transmitted signals.

A method of this invention includes simultaneously transmitting a data signal from at least two antennas with a determined phase difference between the transmitted signals. In one example, the phase difference is provided by a frequency offset. In another example, a phase shift that is a function of time provides the phase difference. Regardless of the specific adjustment strategy chosen, the time variability incorporated into the channel alleviates the problem otherwise experienced when one or more of the mobile units is stationary or moving slowly.

In one example system designed according to this invention, a plurality of antennas is associated with a controller. The controller causes simultaneous transmission of a data signal from at least two of the antennas with a given set of weights from each antenna. The weights of the different antennas are equal in magnitude but have a determined set of frequency offsets. As a result, the array factor of the transmitted signal is time-dependent and periodic in time. In addition to the data signal the controller includes a pilot signal in the same manner as the data signal.

In another example system the controller causes transmission of two or more sets of signals designated for different receivers in the same manner as above, by using a different set of weights for the different signals. In one example these weights are orthogonal to each other and are also used to transmit pilot signals together with data signals.

An additional feature of one embodiment of this invention provides the capability at the mobile station to measure (through pilot) the channel quality of a transmitted data signal in the presence of other data signals being simultaneously transmitted.

In another example system the controller takes into account the deterministic nature of the phase difference and the feedback on the channel quality of a particular user to predict when it is a good time to transmit to that particular user.

The various features and advantages of this invention will become apparent to those skilled in the art from the following detailed description of the currently preferred embodiment. The drawings that accompany the detailed description can be briefly described as follows.

DETAILED DESCRIPTION

This invention includes simultaneously transmitting data signals from at least two antennas with a determined phase difference between the transmitted signals. Introducing a time varying phase difference increases the system throughput, enables the system to simultaneously transmit information to multiple users on the same channel and addresses the situation where one or more users are stationary or moving slowly enough such that their channel conditions remain relatively constant over time. This invention takes advantage of beamforming techniques and provides for simultaneously scheduling multiple users on the same channel with the same set of resources (i.e., codes, frequency spectrum, power). Another advantage stems from the fact that the applied phase differences between different antennas are deterministic and periodic such that a controller may predict, based on feedback of the channel quality of the channel from the transmitters, when is the best time in the future to transmit to a particular user. This predictive power is especially useful for receivers with slowly varying channels. The inventive arrangement is particularly well-suited for transmitting data signals in shared packet data channels.

The term data signal as used in this description includes coded or uncoded combinations of data, voice, video or other messages transmitted between mobile stations and base stations.

Figure 1:
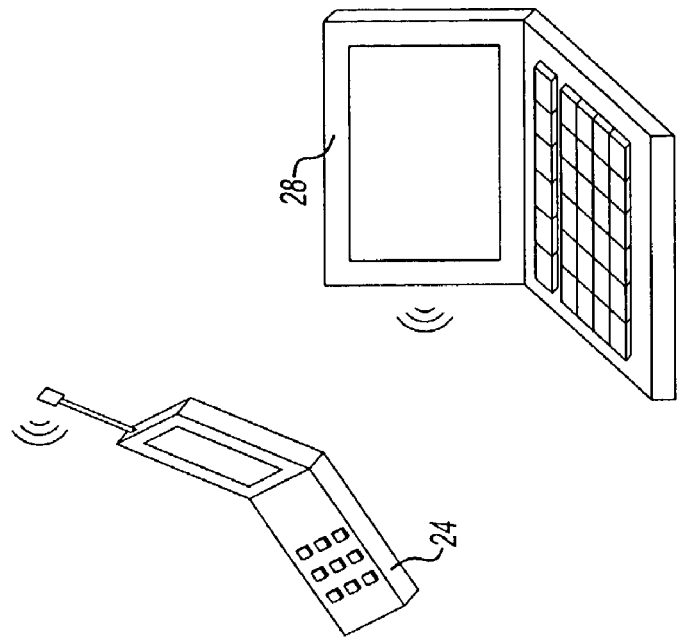
FIG. 1 schematically illustrates selected portions of a wireless data communication system incorporating signal transmission techniques designed according to this invention.
Figure 1:
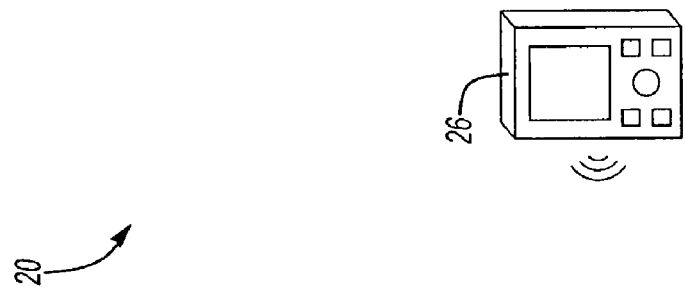
Figure 1:
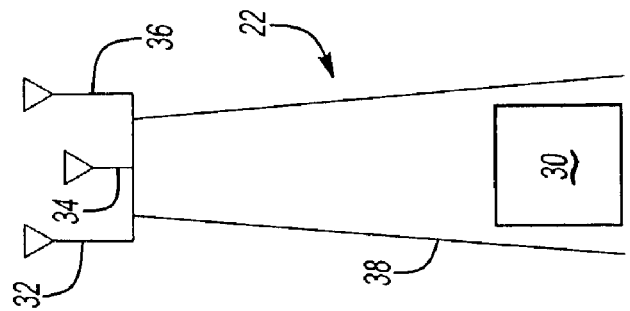

FIG. 1 schematically illustrates a wireless data communication system 20 including a base station 22 and a plurality of mobile units 24, 26 and 28. The mobile units are any of a variety of commercially available communication devices that are capable of receiving data information through a wireless communication interface such as a cell phone 24, a personal digital assistant 26 or a notebook computer 28. Of course, this invention is not limited to any particular mobile unit. The illustrated examples are provided to show different types of user devices that may be used in a system designed according to this invention. In addition, in general the roles of the receivers and transmitters may be interchanged.

The base station 22 includes a system controller 30 that includes known radio equipment and signal processing equipment that is useful for generating and processing data and communication signals in a wireless network. The controller 30, for example, includes the necessary electronics and software for deciphering and managing signals received at the base station and for generating or transmitting the signals necessary to achieve the communications desired within the network.

The illustrated base station 22 includes a plurality of antennas 32, 34 and 36 supported on a tower 38 in a conventional manner. The system controller 30 causes a data signal to be simultaneously transmitted from at least two of the antennas with a deterministic, time-dependent and periodic phase difference between the transmitted signals. Including a deterministic time-varying phase difference between the transmitted signals introduces a time-variability to the channel observed by the receiving antennas of the mobile units 24, 26 and 28, for example. The inventive arrangement increases the system throughput because time varying channels result in higher system throughput for shared channels.

In one example the controller 30 causes simultaneous transmission of a data signal from at least two of the antennas with a selected set of weights from each antenna. The weights of the different antennas are equal in magnitude but have a determined set of frequency offsets. The resulting array factor of the transmitted signal is time-dependent and periodic.

The controller 30 also includes a pilot signal with the data signal in the same manner as the data signal. The pilot signal is received by the user and the instantaneous channel quality for that particular pilot signal is measured. The channel quality in one example is then fed back to the transmitter. A subsequent packet transmission is then based upon such feedback. In one example, the transmitter also takes into account the fact that the applied phase differences between the signals of different antennas are periodic to predict when is a good time to transmit to a particular receiver.

Figure 2:
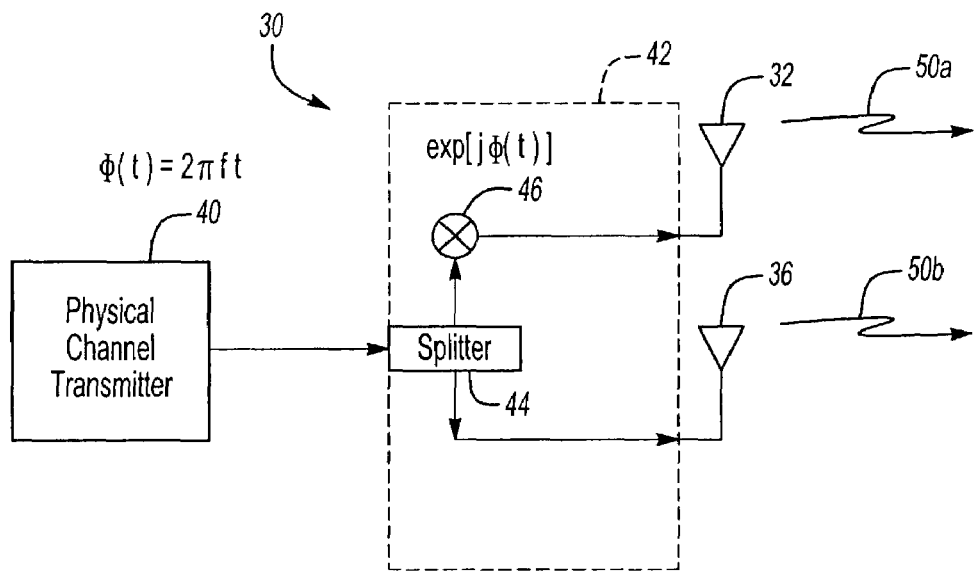
FIG. 2 schematically illustrates selected portions of a first example implementation of this invention.

FIG. 2 schematically illustrates an example implementation of this invention using example antennas 32 and 36. In this example, selected portions of the system controller 30 are shown such as the channel transmitter 40 and a phase management module 42. The operation of this portion of the system can be done in RF or in baseband. In this example, the data signal from the transmitter 40 (i.e., a generally time-dependent signal x(t)) is split using a splitter 44 so that the signal arriving at the antenna 36 is $x(t)/\sqrt{2}$. A phase shifter portion 46 adjusts the phase of the signal arriving at the antenna 32 such that $x(t)\exp[j\Phi(t)]/\sqrt{2}$ describes that signal, where $\Phi(t)$ is the phase difference between the two antenna signals. The data signals transmitted by the antennas 32 and 36 contain the same information (i.e., the same data) but have a phase difference between them. Both data signals are sent on the same channel in this example.

The phase adjustment portion 46 may operate in a variety of manners. In one example, the phase adjustment portion 46 applies a time-based deterministic phase adjustment. In one embodiment the optimal frequency offset is picked based on measurements or simulations so as to optimize some criteria such as total throughput, etc. In one particular example, the phase adjustment portion 46 applies the formula: $\exp(j\Phi(t))$, where $\Phi(t)=2\pi ft$ and f is the frequency of the data signal. Various phase shifting approaches are useful in a method designed according to this invention. The frequency offset in one example is a function of antenna separation. In this particular example, if a particular receiver is stationary, then the feedback channel quality information to the transmitter may be close to a periodic function of time with period 1/f. In this case the transmitter may use the prior channel quality information feedback to predict in the future when is a best time to serve that particular receiver. This effect can mitigate some of the effects of delays in the system.

The schematic divisions of the figures are for discussion purposes only. Those skilled in the art who have the benefit of this description will realize that a variety of combinations of hardware, firmware and software may be used within one or more portions of the controller 30 to realize the functions of the channel transmitter 40, phase management module 42 and the phase shifter portion 46, for example.

Simultaneously transmitting the data signals using the antennas 32 and 36 with a phase difference between them provides significant advantages including increasing the throughput of the system. Incorporating the time variability in the channel helps to alleviate the problem experienced when at least one mobile unit is stationary or moving slowly through a region. The time variability introduced by the determined phase difference effectively causes the stationary or slower-moving mobile units to appear as if they are moving with time. Accordingly, scheduling techniques can be used to increase the multi-user diversity even when one or more users is stationary or moving relatively slowly.

The deterministic scheme of this invention allows for predicting the optimal scheduling for stationary and slowly moving users. The requested rates of each such user will follow a deterministic sinusoidal pattern, which allows the scheduler portion of the controller 30 to predict and optimize future scheduling for each user based upon the rate history of each user. Accordingly, the inventive arrangement allows for scheduling multiple users without requiring obtaining channel information for those users. Instead, a time-based deterministic phase difference allows a suitably programmed system controller 30 to make scheduling determinations based upon the rate history.

A variety of known scheduling techniques may be used in a system designed according to this invention. Those skilled in the art who have the benefit of this description will be able to select the appropriate scheduler to best meet the needs of their particular situation. In one example, the period of the phase swept transmit diversity of this invention is relatively short compared to the forgetting time of the scheduler. This allows for each user to reach an optimum channel condition value and to be scheduled by the chosen scheduling technique. In this example, the period also is relatively long compared to the data packet length so that the channel will be at least quasi-static during packet transmission.

The spacing between the antennas may be set to meet the needs of a particular situation. The plurality of antennas used for simultaneously transmitting the data signals need not all be located at the same base station. In one example, the distances between the antennas selected for simultaneous data signal transmission varies between $\lambda/2$ and $20\lambda$, where $\lambda$ is the carrier frequency wavelength. In one example, the minimum distance between antennas is on the order of 7 cm. In one example, the maximum distance between antennas is a few meters. Those skilled in the art who have the benefit of this description will be able to select appropriate antenna spacing and an appropriate frequency based, at least in part, on the selected spacing to meet the needs of their particular situation. For example, the frequency appropriate for a relatively close spacing is large while that for relatively distant spacing is small.

Figure 3:
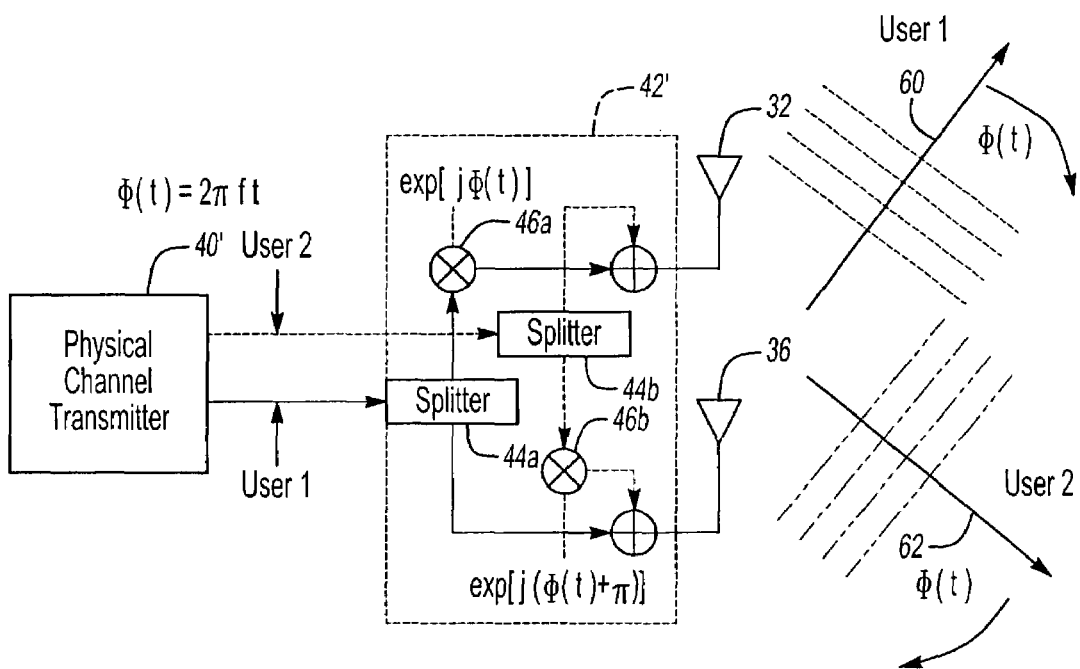
FIG. 3 schematically illustrates selected portions of another example implementation of this invention.

FIG. 3 schematically illustrates selected portions of another example implementation of this invention. This example allows for more than one user to receive their own desired data simultaneously on the same channel. In this example, a channel transmitter 40' causes simultaneous transmission of at least two different data signals 60 and 62 intended for different receivers. The data signals 60 and 62 are simultaneously transmitted, on the same channel, from the antennas 32 and 36 with a time-dependent, deterministic phase difference between them. In one example, the signals 60 and 62 include a phase difference that is based upon a selected frequency offset. The same approaches as mentioned in connection with the example of FIG. 2 may be used. In particular let $x_1(t)$ be the data signal and pilot signal intended for one beam 60 and $x_2(t)$ be the combined data signal and pilot signal for the other beam 62. Then the antenna 32 should transmit $[x_1(t)+x_2(t)]/\sqrt{2}$ and antenna 36 should transmit $[x_1(t)-x_2(t)]\exp[j\Phi(t)]/\sqrt{2}$. In this case the two beams will be orthogonal if the antenna patterns are omnidirectional.

In the example of FIG. 3, the phase management module 42' handles each of a plurality of simultaneously transmitted user signals each intended for a different user. In the illustrated example a first splitter 44A splits a first generally time-dependent signal x(t) intended for one user so that the first user signal arriving at the antenna 36 is $x(t)/\sqrt{2}$. A phase shifter portion 46A adjusts the phase of the first user signal arriving at the antenna 32 such that $x(t)\exp[j\Phi(t)]/\sqrt{2}$ describes that signal, where $\Phi(t)$ is the phase difference between the two antenna signals.

The phase management module 42' also includes a splitter 44B that splits the signal intended for a second user so that the second user signal arriving at the antenna 32 is $x(t)/\sqrt{2}$. A phase shifter portion 46B adjusts the phase of the second user signal arriving at the antenna 36 such that $x(t)\exp[j\Phi(t)]/\sqrt{2}$ describes that signal, where $\Phi(t)$ is the phase difference between the two antenna signals.

As more than one user can receive each of the signals 60 and 62, one example arrangement includes a pilot within the mobile units that reads an appropriate code within each transmission. The pilot determines the effective channel strength of each beam and thus which of the signals 60 or 62 is intended for the particular user. The mobile unit not only determines the strongest pilot but incorporates in the calculation the reduction in the candidate signal's SNR due to the simultaneous transmission of the other data signals which are intended for different mobile units.

In one example, each data user assesses the channel quality based upon pilots transmitted from the base station. In one particular example, there are N antennas and the pilots are transmitted through N appropriate orthogonal linear combinations of the antenna array with appropriate time-varying phase offsets between antennas as in the above-described case of two antennas. The transmitting antennas may reuse the same codes to increase system capacity. Alternatively each transmitting antenna may have a dedicated code, which simplifies the tasks at the mobile unit as interference cancellation need not be performed by the mobile unit for this portion of the communication.

In one example each user measures the signal to noise ratio of each beam through the use of the pilot symbols. This signal to noise ratio for beam (i) can be written as:

$$SNR_i = \frac{\left|\sum_a h_a w_{ai}\right|^2}{N}$$

where N is the noise at the receiver, $w_{ai}$ is the weight of beam (i) from antenna a (i.e., antenna 32) and $h_a$ is the channel coefficient of antenna a. In one example the SNRs are all sent to the transmitter 40' from each user, so that the transmitter 40' may decide which user to schedule and with which relative power.

In a different implementation, each user feeds back to the transmitter 40' the maximum signal to interference ratio. Assuming equal power transmission through all beams, the following equation describes the maximum signal to interference ratio:

$$SINR = \max_i \frac{SNR_i}{n + \sum_{j \neq i} SNR_j}$$

where n is the number of beams. In addition, the user also may send back the index ($i_0$) of the beam that achieves the maximization of SINR. Based on this information the transmitter 40' can schedule the user, based on information from that user in addition to SINR values of other users and their requested beams. Thus, each user calculates its effective SINR as it would be observed in the presence of other data signals simultaneously transmitted to other users.

In another example implementation, the beam from which a particular user is to be scheduled is decided on a non-instantaneous basis during the admission process, for example. In this case, each user feeds back to the transmitter 40' the signal-to-interference ratio for that particular beam.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A method of transmitting wireless data signals, comprising: simultaneously
   transmitting at least one data signal from each of a plurality of antennas wherein a phase difference between the data signals varies in a periodic, deterministic time-dependent manner; and
   predicting a future time for a transmission from at least one of the antennas based on a previous condition of at least one user and the periodic, deterministic time-dependent phase difference.

2. The method of claim 1, including simultaneously transmitting at least two data signals which are multiplied by a different phase in at least one antenna.

3. The method of claim 2, including transmitting at least one pilot signal with the same phase difference between the antennas as at least one of the data signals.

4. The method of claim 1, including transmitting a pilot signal with the same phase difference between the antennas as the data signal.

5. The method of claim 1, including simultaneously transmitting a plurality of different data signals through different beams, using at least two antennas for each of the beams.

6. The method of claim 5, wherein the beams are orthogonal.

7. The method of claim 1, wherein each of the data signals is transmitted using the same code.

8. The method of claim 1, including selecting a frequency offset to establish the phase difference.

9. The method of claim 8, including selecting the frequency offset by obtaining data regarding the performance of a chosen antenna arrangement at a plurality of frequencies and using at least one of the frequencies that provides a desired throughput performance as the selected frequency offset.

10. The method of claim 1, including multiplying the data signal by a phase before transmission from at least two antennas.

11. A wireless communication system, comprising:
a plurality of antennas; and
a controller that simultaneously transmits a data signal from at least two of the antennas, the controller introducing a phase difference between the transmitted signals that varies in a periodic, deterministic time-dependent manner, the controller predicting a future time for a transmission from at least one of the antennas based on a previous condition of at least one user and the periodic, deterministic time-dependent phase difference.

12. The system of claim 11, wherein the controller simultaneously transmits the same data signal from each of at least two antennas.

13. The system of claim 12, wherein the controller assigns weights to each of the antennas, the weights having the same magnitude and a selected frequency offset.

14. The system of claim 11, wherein the controller simultaneously transmits a plurality of data signals in corresponding beams and the controller uses at least two of the antennas for each of the beams.

15. The system of claim 14, wherein the controller assigns weights to each of the antennas for each of the data signals and wherein the weights are orthogonal to each other.

16. The method of claim 1, wherein the deterministic time-dependent phase difference varies in a sinusoidal manner.

17. The system of claim 11, wherein the deterministic time-dependent phase difference varies in a sinusoidal manner.

18. The method of claim 1, wherein the deterministic relationship between the different phases includes a first phase difference at a first time and a second phase difference at a second, later time that is dependent on the first phase difference.

19. The system of claim 11, wherein the controller uses the deterministic time-dependent phase difference such that the deterministic relationship between the different phases includes a first phase difference at a first time and a second phase difference at a second, later time that is dependent on the first phase difference.

20. The method of claim 1, wherein the previous condition of the user comprises a channel condition.

21. The method of claim 1, wherein the previous condition of the user comprises a data rate requested by the user.

22. The system of claim 11, wherein the previous condition of the user comprises a channel condition.

23. The system of claim 11, wherein the previous condition of the user comprises a data rate requested by the user.

* * * * *